(12) United States Patent
Barber et al.

(10) Patent No.: US 7,016,774 B2
(45) Date of Patent: Mar. 21, 2006

(54) SYSTEM FOR SCHEDULING THE SERVICING OF EQUIPMENT

(75) Inventors: Richard Antony Barber, Chelmsford (GB); Philip John Parke, Leigh-on-Sea (GB)

(73) Assignee: Ford Motor Company Limited, Essex (GB)

( * ) Notice: Subject to any disclaimer, the term of this patent is extended or adjusted under 35 U.S.C. 154(b) by 87 days.

(21) Appl. No.: 10/380,133

(22) PCT Filed: Aug. 6, 2001

(86) PCT No.: PCT/GB01/03529

§ 371 (c)(1),
(2), (4) Date: Jul. 18, 2003

(87) PCT Pub. No.: WO02/23417

PCT Pub. Date: Mar. 21, 2002

(65) Prior Publication Data

US 2004/0093134 A1    May 13, 2004

(30) Foreign Application Priority Data

Sep. 11, 2000    (GB) .................................... 0022182

(51) Int. Cl.
  *G06F 19/00*    (2006.01)
  *G06F 7/00*     (2006.01)
  *G06F 17/40*    (2006.01)
  *G05B 23/00*    (2006.01)
  *G01M 17/00*    (2006.01)

(52) U.S. Cl. ............................ 701/30; 701/29; 701/36; 705/8; 340/500; 340/524

(58) Field of Classification Search .................... 701/1, 701/30, 29, 34, 36; 707/1, 3, 5, 4; 705/8; 340/901, 425.5, 426.23, 463, 464, 500, 504, 340/516, 517, 524
See application file for complete search history.

(56) References Cited

U.S. PATENT DOCUMENTS

| | | | | |
|---|---|---|---|---|
| 5,943,652 A | * | 8/1999 | Sisley et al. ..................... 705/9 |
| 5,974,406 A | * | 10/1999 | Bisdikian et al. ............... 707/1 |
| 6,170,742 B1 | * | 1/2001 | Yacoob ....................... 235/375 |
| 6,263,322 B1 | * | 7/2001 | Kirkevold et al. .......... 705/400 |
| 6,370,454 B1 | * | 4/2002 | Moore ......................... 701/29 |
| 6,516,239 B1 | * | 2/2003 | Madden et al. ............. 700/115 |
| 6,801,821 B1 | * | 10/2004 | Madden et al. ............. 700/101 |
| 2002/0016655 A1 | * | 2/2002 | Joao ............................ 701/35 |
| 2002/0032626 A1 | * | 3/2002 | DeWolf et al. ............... 705/35 |

(Continued)

Primary Examiner—Olga Hernandez
(74) Attorney, Agent, or Firm—David B. Kelley; Brooks & Kushman

(57) ABSTRACT

A computerized, Internet-based method and system for scheduling the servicing a set of items of equipment such as a fleet of motor vehicles each requiring the performance of service operations according to predetermined repair and maintenance schedules comprises compiling databases of information (1) relating to the items of equipment, the service operations (3) to be performed on them and service facilities (4) capable of performing the service operations, deriving by means of a searching and matching system (7) from the compiled information matches for an item, a required service operation and the availability of service facilities for performing the service operation; selecting from the matches a service facility capable of performing the service operation the item and scheduling by means of a notification system (9) the performance of the service operation on the item by the selected service operation.

20 Claims, 4 Drawing Sheets

U.S. PATENT DOCUMENTS

| | | | |
|---|---|---|---|
| 2002/0073000 A1 * | 6/2002 | Sage | 705/29 |
| 2002/0073012 A1 * | 6/2002 | Lowell et al. | 705/37 |
| 2002/0198618 A1 * | 12/2002 | Madden et al. | 700/101 |
| 2004/0113761 A1 * | 6/2004 | Borugian | 340/426.1 |
| 2004/0167689 A1 * | 8/2004 | Bromley et al. | 701/29 |
| 2004/0217852 A1 * | 11/2004 | Kolls | 340/439 |

* cited by examiner

SYSTEM FOR SCHEDULING THE SERVICING OF EQUIPMENT

FIELD OF THE INVENTION

This invention relates to methods of and systems for scheduling the servicing of equipment.

BACKGROUND OF THE INVENTION

Complex items of equipment, such as motor vehicles, construction equipment, manufacturing plant, or domestic electrical equipment, require the performance of routine servicing operations in order to keep them in good working order, and may also require non-routine servicing operations as defects develop in the normal lifetime of the item. Where single items of equipment are installed and maintained in a single location, for example a factory, the problems of scheduling regular service operations is relatively simple, because the owner or user of the equipment will normally be familiar with the construction of the equipment and have maintenance information and facilities readily available. In the case of mass-produced equipment and in particular consumer goods such as motor vehicles, the owners or users of the equipment are generally less familiar with the technical operation of the equipment and even if they are aware of the need for the performance of service operations, they are not well enough equipped to perform them. In order to assist owners and users of such equipment in this area, the manufacturers of the item frequently establish a network of service facilities in the markets where the equipment is sold.

In the case of motor vehicles, such service facilities are normally operated by authorised dealers appointed by the motor manufacturers. The facilities typically comprise people trained in the provision of the service operations, a stock of replacement parts, and tools with which to perform the service operation.

Traditionally, the owner or user of the vehicle has been required to remember when each service operation is due, to initiate contacts with the service facility provider, and make arrangements for the performance of the service operation. Usually this process has been performed over the telephone or by direct personal contacts between the vehicle user on the one hand and the operator of the service facility on the other. Relatively little information available has been available or accessible in advance by the service facility operator about the vehicle, or by the vehicle user about service facility, its availability, or its prices or other important selection criteria. As a result of this lack of information, vehicle users have had difficulty in selecting a service facility best suited to their needs, and the operators of the service facility have been unable to match the services offered to the needs of their customers.

A further problem in the case of motor vehicle arises because of the increasing complexity of service operations to be performed. Vehicle manufacturers are producing vehicles in increasing numbers of model ranges, with more variants within each range, and with more optional equipment than ever before. Since each model, variant and optional feature has different service requirements, the number of possible service operations to be performed by the service facility is increasing in direct proportion. Since the time required to perform a service operation varies with the number of individual tasks to be performed, the scheduling and pricing of service operations by a service facility is also becoming increasingly difficult.

Various proposals have been made to assist customers in selecting providers of goods or services using the world-wide computer web, or Internet exchange. For example, U.S. Pat. No. 5,974,406 discloses an automatic search system which receives from potential customers a search profile identifying the customer's preferences for a particular product or service.

The system uses the search profile to carry out a search of available products and services against a database of information supplied by potential suppliers of the goods or services. The search and matching operation is performed whilst the customer is off-line, and when a match is obtained, the system automatically notifies the customer using a separate communication mode selected by the customer. This system is capable of for bringing together buyers and sellers where the subject of the transaction is relatively simple, but would not details of the where, in order to quote a time and a price for the performance of a service operation, service facility requires more information about the construction of the vehicle than is normally available to the vehicle owner or user. U.S. Pat. No. 5,931,878 discloses a computerised prompting system suitable for reminding vehicle owners that a routine service operation is due on their vehicle. The system comprises a personal database containing information about the vehicle and the owner, and a software system, all stored on a CD-ROM disc, which the owner installs on his or her personal computer. The system then creates prompts for the owner whenever a new service operation is expected to fall due. These prompts can be communicated to a local service facility through the internet to set up an appointment for the performance of the service operation. However such a system is only accessible by vehicle owners in possession of the CD-ROM disc containing the programme and details of the vehicle.

SUMMARY OF THE INVENTION

According to the present invention, there is provided a method and system for scheduling the servicing a set of items of equipment each requiring the performance of service operations according to predetermined repair and maintenance schedules comprising compiling information relating to the items of equipment, the service operations to be performed on the items and service facilities capable of performing the service operations; deriving from the compiled information matches for an item, a required service operation and the availability of service facilities for performing the service operation; selecting from the matches a service facility capable of performing the service operation on the item; and scheduling the performance of the service operation on the item by the selected service operation.

By linking together information about the items of equipment, the service operations to be performed, and the service facilities, the system of the present invention allows the owner or user of the equipment to select and schedule a service facility of choice to perform the service operation.

The method and system of the present invention are capable of application to any set of items of equipment that require regular maintenance and repair, but are particularly suitable for enabling users of mass-produced vehicle to schedule the maintenance and repair of their vehicles with a motor vehicle dealer of their choice.

Preferably, the compiled information is accessed through an Internet user interface that enables the user to select and schedule the performance of the service operation.

In order to facilitate matching of information about the items of equipment the information relating to the items of equipment is preferably compiled in an equipment database in which each item is assigned code that correlates with the service operations to be performed on the item.

Similarly, the information relating to the service operations is also preferably compiled in a service operations database in which service operations are coded according to the items of equipment on which they may be performed.

The information relating to the service facilities is also preferably compiled in a service facility database in which service operations capable of being performed by the service facility are coded according to the items of equipment on which they are to be performed.

To facilitate access to the system, the complied information is preferably accessible by providing information relating to any one of a plurality of different characteristics of the items of equipment. For example in the case a system for scheduling the repair or servicing of motor vehicles, the information relating to the motor vehicles is preferably accessible by supplying the vehicle identification number, the vehicle registration number or a list of features on the vehicle.

Preferably, the information relating to the service facilities includes information on a plurality of selection criteria for the service facilities, for example the periods of availability of facilities; the prices offered for performance of the service operation, and availability of complementary equipment or services. In the case of facilities for the repair and maintenance of motor vehicles, such complementary services would include for example the availability of alternative transport whilst the service operation is being performed.

The various process steps of the present invention can be implemented on any conventional computer having the necessary storage capacity and communications functions, details of which will be familiar to any person skilled in the art. The invention therefore includes a computer programme comprising computer program code adapted to perform the method of the invention when installed and run on a computer. The invention also includes a computer program in accordance with the invention embodied on a computer-readable medium.

BRIEF DESCRIPTION OF THE DRAWINGS

The invention will now be described further, by way of example, with reference to the accompanying drawings, in which:

The method described in the drawings is a computerised system for scheduling the servicing of motor vehicles. Referring to FIG. 1, in broad outline, the system comprises three databases. First, a vehicle database 1, compiled and maintained by or on behalf of the vehicle manufacturer 2; secondly, a service operations database 3, also compiled and maintained by or on behalf of the manufacturer 2 and thirdly, a service facility database 4 compiled and maintained for or on behalf of' service operators, namely motor vehicle dealers 5 appointed by the vehicle manufacturer 2. The compilation and maintenance of the vehicle, service operations and service facility databases 1,3 and 4 are all effected through conventional Internet interface systems 2a and 5a.

Figure 1:
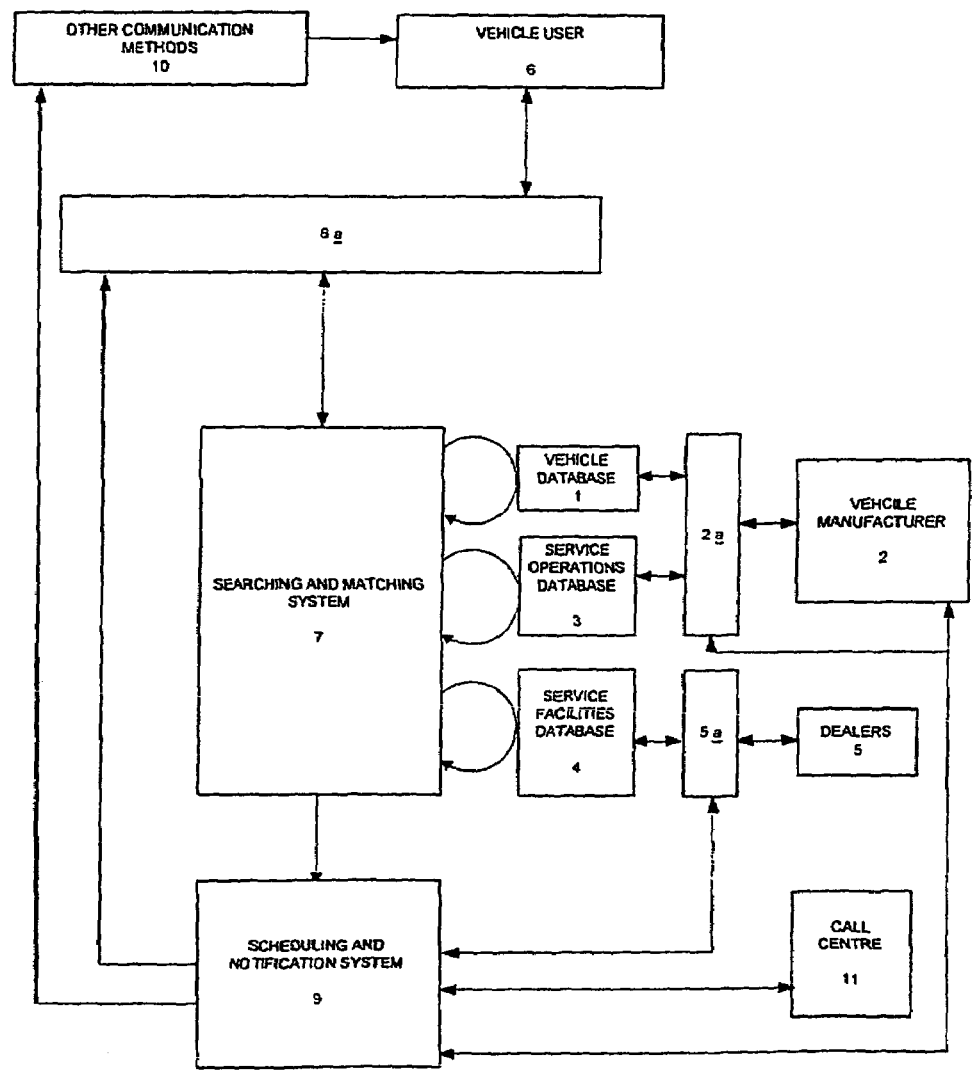
FIG. 1 is a flow chart illustrating in broad outline a method for scheduling the servicing of motor vehicles in accordance with the invention as embodied in a computer system.

The system also comprises a searching and matching system 7 which accesses the three databases 1,3 and 4 and a scheduling and notification system 9.

The scheduling and notification system 9 contains a database maintained by the dealers 5 of various categories of information relating to the performance of the service operation by the dealers 5, which constitute selection criteria for the vehicle user 6. Examples of such selection criteria are periods of availability of facilities; prices for performance of the service operation, and the availability supplementary equipment or services such as a courtesy car for use by the vehicle owner whilst the service operation is being carried out. The scheduling and notification system 9 establishes two-way communications between the vehicle user 6 and the dealers 5 to confirm arrangements for scheduling the performance of the service operation. The system also establishes communication between the vehicle manufacturer 2 and other interested parties such as the manufacturer's customer assistance or telephone call centre 11.

The operation of the scheduling system shown in FIG. 1 is as follows.

If a vehicle user 6 wishes to have a service operation carried out on a particular vehicle, the vehicle user 6 accesses the vehicle, service operations and service facility databases 1,3 and 4 through a conventional Internet interface system 6a and the searching and matching system 7. The searching and matching system 7 obtain matches for the vehicle, the required service operation and the dealers 5 who are available to perform the service operation, and presents the available matches to the vehicle user 6. The vehicle user 6 then selects a preferred dealer to perform the service operation and schedules the performance of the service operation by the selected dealer 5.

The notification system 9 then confirms the scheduling of the service operation to the vehicle user 6 and the dealer 5. The confirmation to the vehicle user 6 may be made either through the vehicle user's Internet connection 6a, or by an alternative mode of communication 10, as selected by the vehicle user 6, for example conventional mail services, telephone messaging services (known as SMS) or Internet communications systems adapted for use by mobile telephones (known as WAP).

The notification system 9 is also accessible by the vehicle dealer 5 independently of the vehicle user 6 to send messages to the vehicle user 6 for example regarding the progress of the service operation, or prompts about any routine service operation that is expected to be due in the near future. In addition the notification system 9 is accessible by the vehicle manufacturer 2 who may wish to communicate directly with vehicle owners 6, for example in the case of a vehicle recall campaign. Other operations, such the vehicle manufacture's customer call centre 11 may also have access to the notification system for the purpose of communication with the vehicle user about the vehicle.

Figure 2:
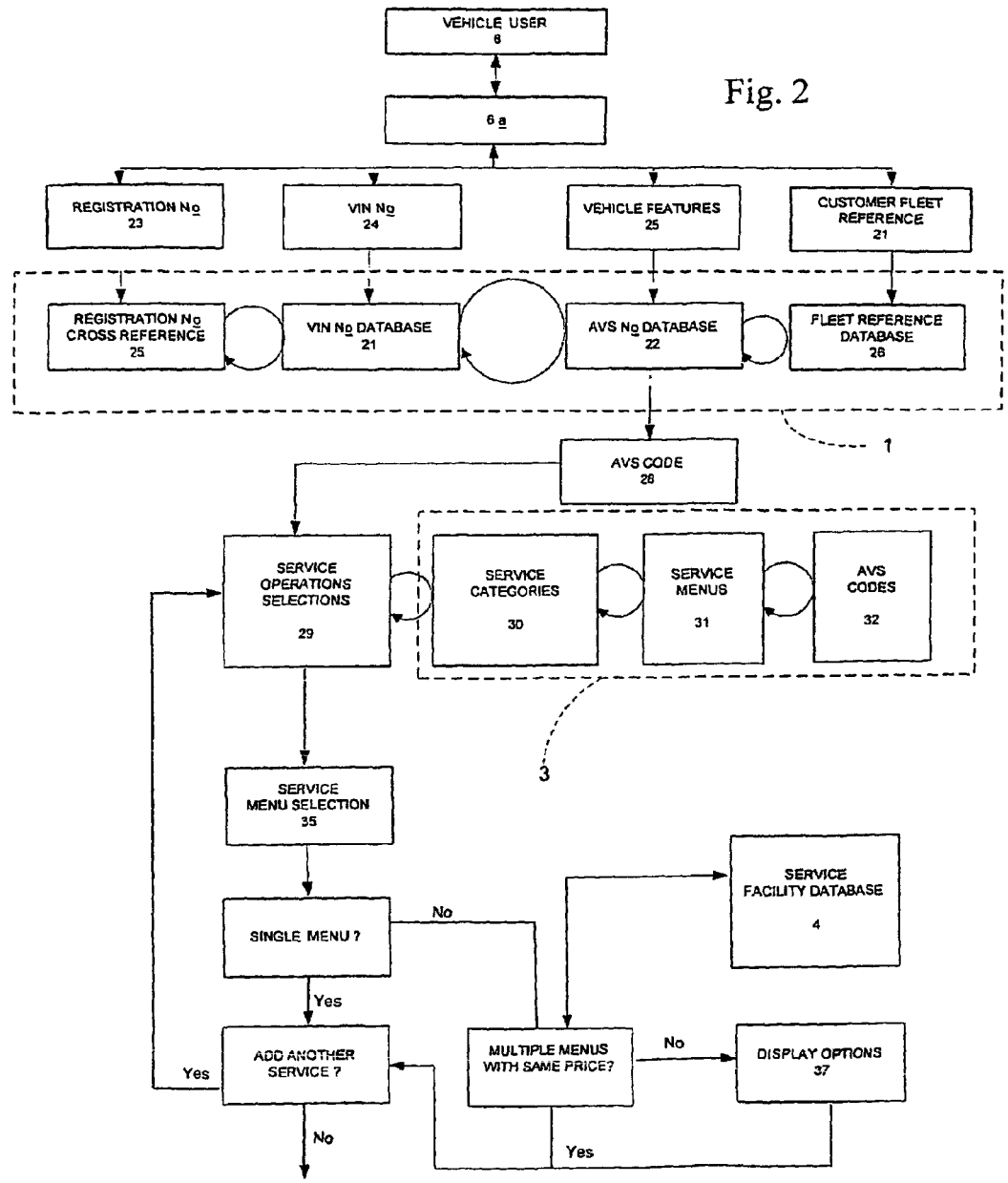
FIGS. 2 to 4 are flow charts illustrating in more detail the structure and function of different parts of system of FIG. 1.

FIG. 2 illustrates in more detail the structure and function of the searching and matching system 7 and the vehicle database 1.

The first operation carried out by the searching and matching system 7 is the identification of the relevant vehicle in the vehicle database 1.

The vehicle database 1 contains two categories of data. The first category comprises the vehicle identification number, or VIN number, of all the vehicles in relation to which the system can be applied. These numbers are stored in a VIN number database 21. All vehicle manufacturers allocate VIN numbers to vehicles, which uniquely identify their vehicles. The VIN number is displayed on the vehicle, for example by a stamping on the vehicle chassis or on a plate attached to the vehicle at a readily-accessible location. VIN numbers are usually structured according to a code system that enables a person familiar with the system to derive from the VIN number basic information about the vehicle, for example the vehicle type, and its date and place of manufacture. However, VIN numbers are not normally structured in such a way as to enable the vehicle to be matched with all the possible service or repair operations to be performed on the vehicle during its lifetime.

Accordingly the vehicle database 1 also incorporates an Applicable Vehicle Specification (AVS) database 22 that contains codes (referred to herein as AVS codes) for each vehicle that are specifically structured to correlate relevant service operations with individual vehicles. The AVS codes typically comprise a string of code letters, groups of which indicate the following information about the vehicle: the vehicle line, date of build, engine type, right- or left-hand drive, version, transmission type, body or cab style, emission requirements, presence or absence of air conditioning, series, wheel base, axle ratio, and territories where sold or not sold. Since the AVS code for a vehicle gives full information about the structure of the vehicle, it can be used to identify all the service operations that need to be performed on the vehicle at a particular service interval. For example an AVS code that contains a string code letters indicating that the vehicle has an automatic transmission will imply a different combination of service operations at a particular time from a vehicle with a similar AVS code, but containing a string of code letters indicating that the vehicle has a manual transmission.

The VIN database 21 and the AVS database 22 are linked together so that the AVS code for the vehicle can be derived from the VIN number.

When the vehicle user 6 first accesses the scheduling system, he or she is asked to enter information about the vehicle that enables the AVS code of the vehicle to be found. The information provided by the customer can be in one of three formats, each of which provides information relating to different characteristics of the items of equipment, namely the vehicle registration or licence plate number 23, the vehicle VIN number 24 or a list of physical features on the vehicle.

If the vehicle user 6 chooses to enter the VIN number 24, the AVS code 27 is determined by cross-referring the VIN number database and the AVS database 22.

In most countries the vehicle registration number is assigned to the vehicle when first registered in a country, and does not normally change over the lifetime of the vehicle. The vehicle database therefore contains a registration number database 25 which cross-refers vehicle registration numbers and VIN numbers. If the vehicle user 6 chooses to enter the vehicle registration number 23, the AVS code 28 is determined by cross referring the registration number 23 to the VIN number database 21 and then to the AVS number database 22.

The vehicle user may alternatively enter into a dialogue with the searching and matching system which asks the vehicle user to list the features 25 of the vehicle on which the AVS code is based. These features are then encoded to form an AVS number which is then compared with the AVS database 22 to confirm the AVS code 28.

When a vehicle user uses the system for the first time in connection with a particular vehicle, the vehicle user is allocated a customer fleet reference number 21 to facilitate future access to the system. Each customer fleet number of a vehicle user is compiled into a customer fleet reference database 26. A fourth option of the vehicle user 6 is therefore to access the vehicle database 1 by providing a vehicle fleet reference number 27.

When searching and matching system 7 has identified an AVS code 28 for the vehicle, the next step is the identification of the relevant service operation, 29.

For this purpose, the vehicle user 6 addresses the service operations database 2. This database contains three classes of information. Firstly, all available repair and service information is classified into service categories 30.

Typical service categories 30 would include the routine 15,000, 30,000 and 60,000 km services. Secondly, each service category is associated with a set of 'menus' of service operations 31, each of which comprises a unique combination of individual service operations, labour times and parts required for that service category (change engine oil, change brake pads, etc). Within each service category, the service menus are grouped into sub-sets according to vehicle type (e.g. by the relevant model name). Thirdly, for each service menu 31, the AVS codes 32 of all the vehicles to which those menus are applicable, grouped first by vehicle type and then by individual AVS code. For example, the menu for the 15,000 km service operations to be performed on 3-door vehicles of the range sold under the trade mark FIESTA having gasoline engines and manual transmissions would be associated with the AVS codes of all vehicles of that type.

When the vehicle user 6 has identified the AVS code 28 for the vehicle, and the required category of service operation 30, the searching and matching system 7 retrieves from the service operations database 3 all those service menus 31 relating to the selected service category 30 together with the associated AVS codes, excluding, first, any such menus that fail to include the AVS codes of the vehicle type (FIESTA in this example) then any such menus that do not match the AVS code of the vehicle type on which the vehicle user 6 has requested the service operation.

By this process, the searching and matching system 7 will normally identify a single menu 35 for review by the vehicle user. However, in some cases more than one menu 36 may be identified on some occasions, for example where the AVS code fails to distinguish between vehicles of a very similar build but having different detailed features of construction not identified at the time of manufacture with different service requirements. For example, unless separate AVS codes have been established for the same vehicle fitted with solid disc brakes or vented disc brakes, two menus will be returned, one for service of vehicles with vented disc brakes, the other for vehicles with solid disc brakes. In this case the searching and matching system 7 then compares the prices for the performance of the multiple service operations by reference to the service facility database 4. If the prices are different, then the multiple options are displayed 37 and the vehicle user is asked to choose between them, or is quoted both prices. Having selected a service operation, the vehicle user is offered the opportunity of arranging another service operation 38 on the vehicle, which, if accepted restarts the service operation selection identification process 29

Figure 3:
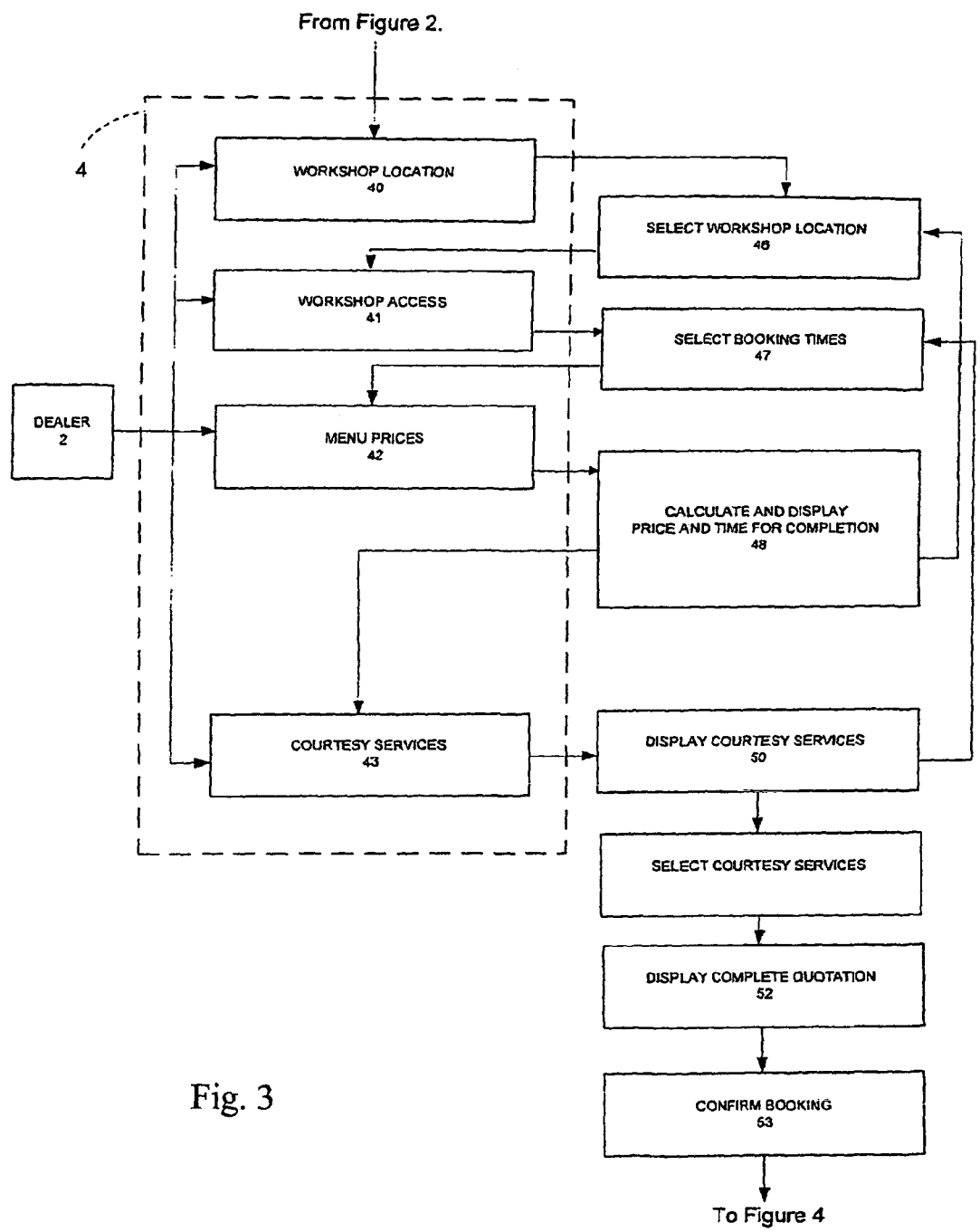

FIG. 3 illustrates in more detail how the searching and matching system 7 allows the vehicle user 6 to select a service facility to perform the selected service operation on the vehicle.

The service facility database 4 contains four categories of information representing selection criteria upon which the vehicle user 6 can select a service facility that best suites his or her needs. These selection criteria comprise first, workshop location information 40 about the geographical location of those service facilities capable of performing the selected service operation, and other information such as contact details, and details of any associated service facilities such as separate body repair premises.

Secondly, the service facility database 4 contains workshop access information 41 giving details of periods during which the service facility is available to perform the service operation. The availability of the service facility for a particular service operation will depend on the one hand on the availability of technicians and any specialist equipment or replacement parts required in the performance of the service operation and, on the other hand the work scheduling process of the individual dealer. The dealers therefore regularly update the workshop access information 41 to include daily and weekly opening hours of the service facility, closures for national and local holidays, segmentation of working days into booking patterns according to shifts, work periods; numbers of available technicians, the availability of individual technicians, the availability of specialist equipment, and whether the vehicle user 6 requires the service operation to be carried out whilst the vehicle user waits at the service location for completion.

Thirdly, the service facility database 4 includes price information 42 for the service menus 31 available to vehicle users 6, which will typically including prices for individual parts and the technician's time, and the periods during which quoted prices are applicable.

Fourthly, the database 4 contains information about courtesy services 43, such as timetables for courtesy coaches, the availability of courtesy cars and the availability of drivers for collection and delivery.

When the vehicle user 6 has identified the relevant service menu 30 for the service operation, the searching and matching system 7 derives from the service facility database 4 information about the location of those service facilities that are capable of offering the selected service operation, and displays it to the vehicle user, who makes a selection 46. The searching and matching system 7 then derives from the workshop access information 41 details about available booking times 47 for the service operation, from which the vehicle user makes a further selection. The system 7 then calculates and displays from the menu price information 42 details of the price 48 of the service operation if carried out at the selected time. If the price is not acceptable, the vehicle user can return to make another workshop selection 46.

If the price 48 is acceptable, the system 7 derives from the courtesy services information 43 details of courtesy services 50 available at the selected time. If the courtesy services 50 available are not acceptable, the vehicle user can return to make another booking time selection 47, or select another dealer.

If the courtesy services 50 are acceptable, the system 7 displays a complete quotation 52 for the performance of the service operation 6, which the vehicle user confirms (53).

Figure 4:
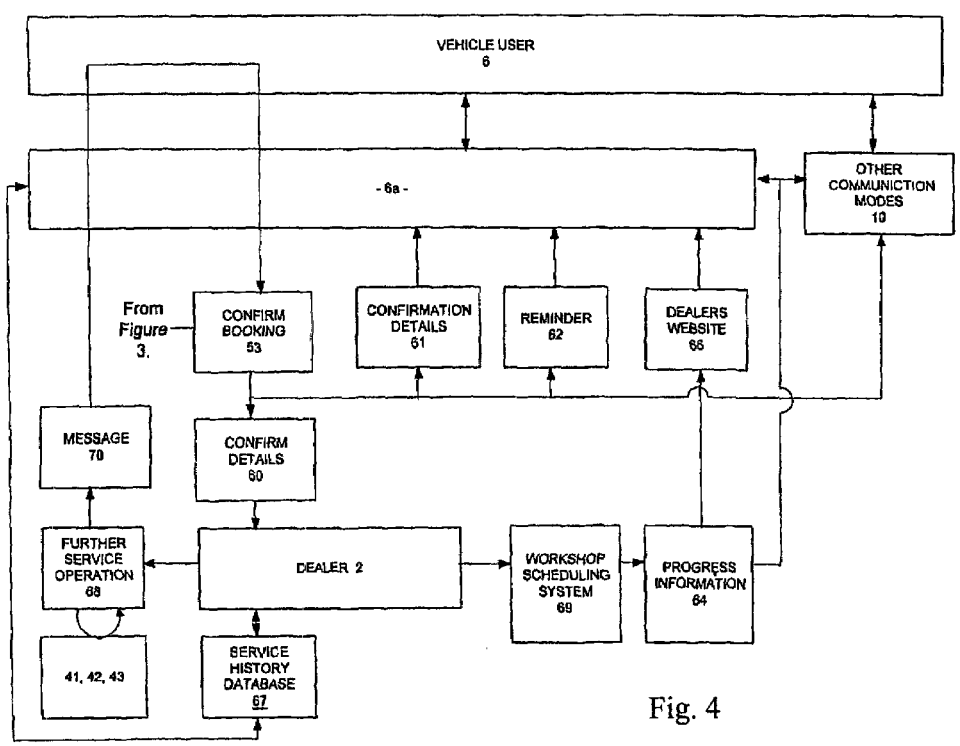

FIG. 4 illustrates in more detail the structure and function of the notification system 9.

After confirmation 53 of the booking by the vehicle user 6, details 60 about the scheduled service operation are sent to the dealer 2 for entry into the dealer's workshop scheduling system 69 and a database 67 containing the service history of the vehicle. Typically these details will include the details of the vehicle user 6, the vehicle, the required service operation, the price quotation, the time and date scheduled for the service operation, requirements for any courtesy services, and of any necessary parts or equipment.

The notification system also sends confirmation details 61 of the appointment by e-mail to the vehicle user 6, typically giving details of the selected dealer, the vehicle, the service operation requested, the price quotation, the time and date scheduled for the service operation, and reservations of any courtesy services. The notification system 8 also sends a reminder 62 by e-mail to the vehicle user 6 immediately prior to the date of the scheduled service operation.

The dealer 2 may use the notification system 8 to make information 64 about the progress of a prolonged service operation available to the customer either directly by e-mail, or by other means such as posting a notice on the dealer's internet web site 66; or sending a message by another communication mode 10 such as WAP or SMS. The vehicle user 6 may also be provided with access to the dealer's service repair history database for information about the vehicle.

When another service operation 68 becomes due on the vehicle, such as a such as the next scheduled service or a statutory test of the vehicle, or the need for a modification as a result of a recall campaign by the vehicle manufacturer, the dealer may use the scheduling and notification system 8 to send prompt messages 70 to the vehicle user. The message 70 can include available times, prices and courtesy services by synchronisation with the dealer's workshop access database 41, menu price database 41 courtesy service database 43, and service history database 67 as appropriate. The vehicle user 6 can use the message 70 to return a confirmation 53 of the booking proposed by the dealer 2.

Finally, (as indicated in FIG. 1) the vehicle manufacturer or a customer call centre can access the notification system to send specific information about the vehicles to the vehicle user, for example in the case of a general recall of defective vehicles, or to contact the vehicle user in connection with sales promotion activities.

What is claimed is:

1. A computer-implemented method for scheduling service of a set of equipment, comprising the steps of:
   compiling information to form compiled information in an equipment database relating to a set of equipment, the one or more service operations to be performed on each equipment and one or more service facilities for performing the one or more service operations for each equipment;
   determining the one or more service operations to be performed on each equipment based on a predetermined repair and maintenance schedule;
   for each equipment in the set, electronically deriving from the compiled information in the equipment database one or more matches based on the one or more service operations and the availability of the one or more service facilities for performing the service operation;
   for each equipment in the set, selecting from the matches a service facility for performing the one or more service operations; and
   for each equipment in the set, scheduling the performance of the one or more service operations by the selected service facility.

2. A method according to claim 1, further comprising assigning a code that correlates with the one or more service operations to be performed on the equipment.

3. A method according to claim 1, wherein the compiled information in the equipment database is accessible by providing information relating to any one of a plurality of different characteristics of the equipment.

4. A method according to claim 3, wherein the set of equipment is a set of motor vehicles and information relating thereto may be accessed by supplying the vehicle identification number, the vehicle registration number of a list of features on the vehicle.

5. A method according to claim 1, wherein the information relating to the one or more service operations is compiled in a service operations database in which the one or more service operations are coded according to the equipment on which they may be performed.

6. A method according to claim 1, wherein the information relating to the one or more service facilities is compiled in a service facility database in which the one or more service operations capable of being performed by the one or more service facilities are coded according to the equipment on which they are to be performed.

7. A method according to claim 1, wherein the information relating to the service facilities includes information on a plurality of selection criteria for the service facilities.

8. A method according to claim 7, wherein the plurality of selection criteria comprise one or more of the following categories of information: periods of availability of facilities; prices for performance of the service operation; and availability of complementary equipment or services.

9. A method according to claim 1, wherein the compiled information in the equipment database is accessed by the user of the equipment through an internet user interface that enables the user to select and schedule the performance of the service operation.

10. A method according to claim 1, wherein the set of equipment comprise a set of mass produced motor vehicles.

11. A computer system for scheduling service of a set of equipment, the system comprising:
  a computerized database of compiled information relating to a set of equipment, one or more service operations to be performed on each equipment and one or more service facilities for performing the one or more service operations;
  a electronic searching and matching system for:
    determine the one or more service operations to be performed on each equipment based on an predetermined repair and maintenance schedule;
    derive from the compiled information one or more matches based on the one or more service operations and the availability of the one or more service facilities for performing the one or more service operations for each equipment; and
    select from the matches a service facility for performing the one or more service operations; and
  a scheduling and notification system for scheduling the performance of the one or more service operations by the selected service facility.

12. A system according to claim 11, wherein the information relating to the set of equipment is compiled in an equipment database and each equipment is assigned a code that correlates with the one or more service operations to be performed on the equipment.

13. A system according to claim 11, wherein the compiled information is accessible by providing information relating to any one of a plurality of different characteristics of the equipment.

14. A system according to claim 13, wherein the set of equipment comprise a set of motor vehicles and information relating thereto may be accessed by supplying a vehicle identification number, a vehicle registration number of a list of features on the vehicle.

15. A system according to claim 11, further comprising a service operations database in which the one or more service operations are coded according to the equipment on which they may be performed.

16. A system according to claim 11, further comprising a service facility database in which the one or more service operations capable of being performed by the service facility are coded according to the equipment on which they are to be performed.

17. A system according to claim 11, wherein the service facility database includes information on a plurality of selection criteria for the service facility.

18. A system according to claim 17, wherein the plurality of selection criteria comprise one or more of the following categories of information: periods of availability of facilities; prices for performance of the service operation; and availability of complementary equipment or services.

19. A method according to claim 11, wherein the database of compiled information is accessed by the user of the equipment through an internet user interface that enables the user to select and schedule the performance of the service operation.

20. A computer-implemented method of scheduling service of a fleet of motor vehicles, the method comprising:
  electronically receiving fleet information including information relating to a number of motor vehicles in a fleet, one or more service operations to be performed on each motor vehicle, and one or more service facilities for performing the one or more service operations for each vehicle;
  electronically storing the fleet information in a fleet database;
  determining the one or more service operations based on a predetermined repair and maintenance schedule and without fleet proprietor intervention;
  for each vehicle in the fleet, electronically deriving one or more service matches based on the one or more service operations and the availability of the one or more service facilities;
  for each vehicle in the fleet, receiving a service facility from the one or more service matches; and
  for each vehicle in the fleet, receiving an appointment for the performance of the one or more service operations by the received service facility.

* * * * *